(12) United States Patent
Yokose

(10) Patent No.: US 7,555,647 B2
(45) Date of Patent: Jun. 30, 2009

(54) ENCODING DEVICE, DECODING DEVICE, ENCODING METHOD, DECODING METHOD, AND PROGRAM THEREFOR

(75) Inventor: Taro Yokose, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 726 days.

(21) Appl. No.: 11/081,713

(22) Filed: Mar. 17, 2005

(65) Prior Publication Data

US 2006/0045361 A1     Mar. 2, 2006

(30) Foreign Application Priority Data

Sep. 1, 2004    (JP)  ........................... P.2004-254086

(51) Int. Cl.
*H04L 9/00*    (2006.01)
*G09C 3/00*    (2006.01)

(52) U.S. Cl. ........................... 713/168; 713/179; 380/54

(58) Field of Classification Search .................... 380/54, 380/200–203, 216–217; 713/176, 168, 179; 726/26, 31–32; 382/100
See application file for complete search history.

(56) References Cited

U.S. PATENT DOCUMENTS 5,832,119 A * 11/1998 Rhoads ........................ 382/232
6,425,081 B1 * 7/2002 Iwamura ...................... 713/176

FOREIGN PATENT DOCUMENTS

JP      A 11-313326      11/1999

* cited by examiner

*Primary Examiner*—Hosuk Song
(74) *Attorney, Agent, or Firm*—Oliff & Berridge, PLC

(57) ABSTRACT

An encoding device to encode an object image to be encoded includes a reference information generating unit that generates reference information with respect to a key image different from the object image, and a code generating unit that generates code data of the reference information generated by the reference information generating unit as code data of at least a portion of the object image.

10 Claims, 15 Drawing Sheets

FIG. 1A

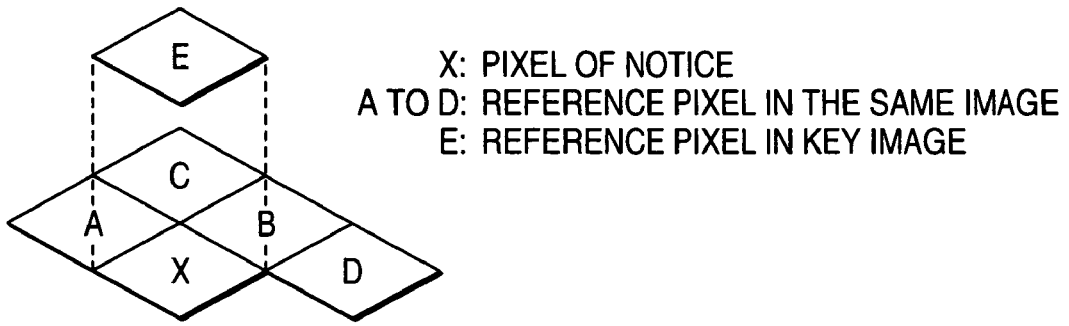

X: PIXEL OF NOTICE
A TO D: REFERENCE PIXEL IN THE SAME IMAGE
E: REFERENCE PIXEL IN KEY IMAGE

FIG. 1B

| CODE C | CODE E | CODE A | CODE A | PRE-DICTION ERROR |
|---|---|---|---|---|
| PRE-DICTION ERROR | CODE A | CODE E | PRE-DICTION ERROR | CODE E |
| CODE A | CODE E | PRE-DICTION ERROR | CODE E | CODE A |
| CODE E | CODE A | CODE D | CODE A | CODE E |
| PRE-DICTION ERROR | CODE A | CODE A | CODE E | PRE-DICTION ERROR |

CODES A TO E: CODES INSTRUCTING OF REFERRING REFERENCE PIXELS A TO E
PREDICTION ERROR: DIFFERENCE BETWEEN PIXEL OF NOTICE X AND REFERENCE PIXEL E

PREDICTIVE ENCODING WITH REFERENCE TO KEY IMAGE

DECODING WITH REFERENCE TO IMAGE OF ENTIRE WHITE SCREEN

FIG. 5A
REFERENCE PIXEL
OF KEY IMAGE
PREDICTION UNIT 1520
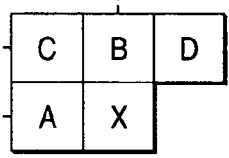
REFERENCE PIXEL
OF OBJECT IMAGE
PREDICTION UNIT 1510
FIG. 5B
PRIORITY AND CODE OF PREDICTION UNIT
| PREDICTION UNIT | PRIORITY | CODE |
|---|---|---|
| A | 2 | CODE A |
| B | 3 | CODE B |
| C | 4 | CODE C |
| D | 5 | CODE D |
| E | 1 | CODE E |
FIG. 5C
EXAMPLE OF CODE DATA
| CODE B | NUMBER OF RUNS (2) | CODE E | ERROR VALUE | CODE E | NUMBER OF RUNS (5) | ... |

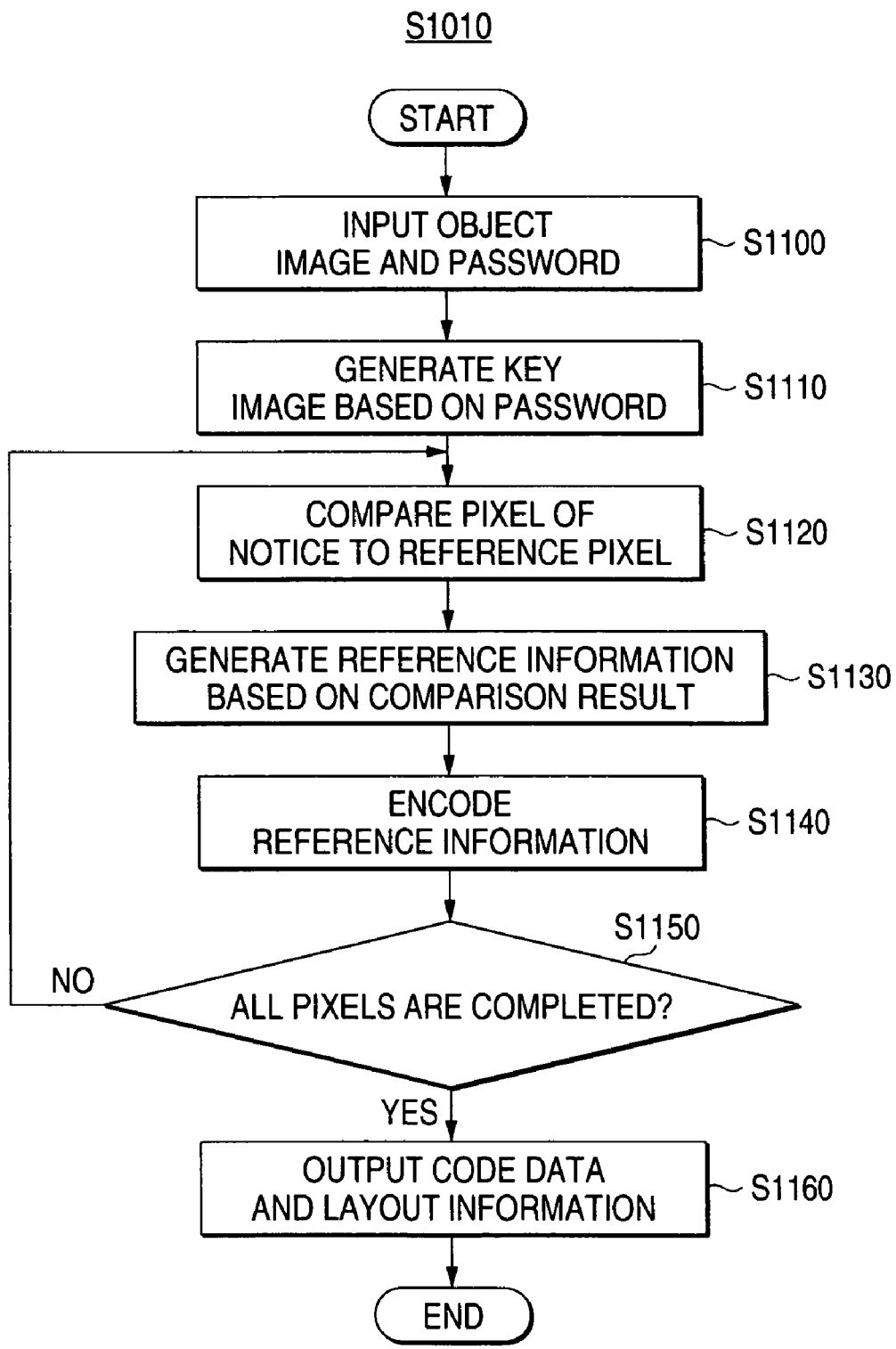

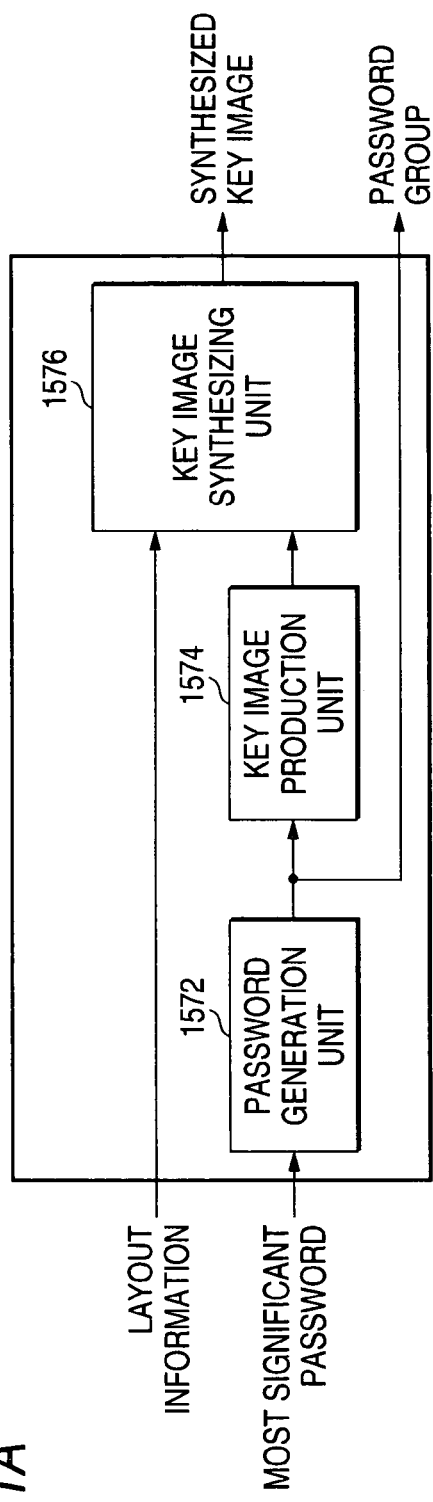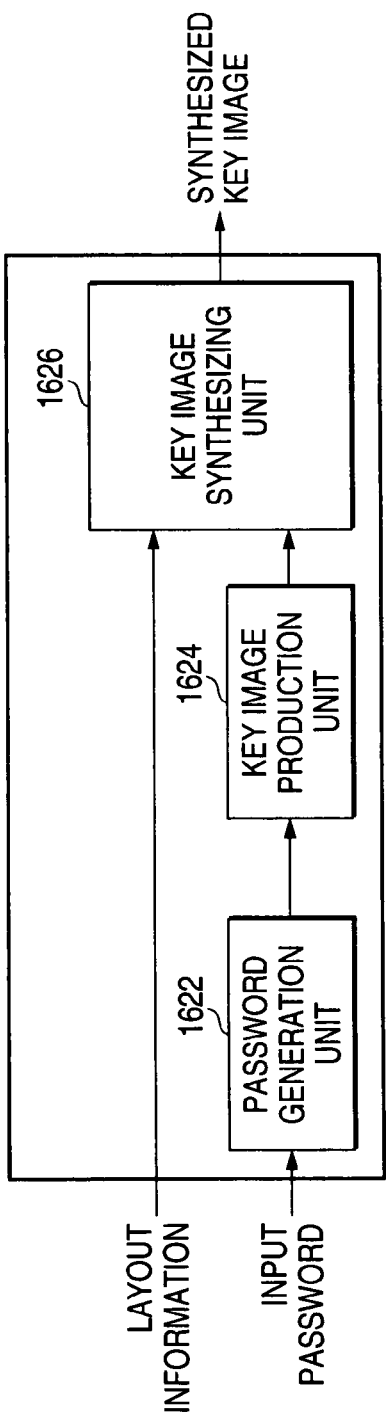

1742

P1: RANDOM NUMBER GENERATED WITH PASSWORD 1
P2: RANDOM NUMBER GENERATED WITH PASSWORD 2
P3: RANDOM NUMBER GENERATED WITH PASSWORD 3

SYNTHESIZED KEY IMAGE CORRESPONDING TO PASSWORD 2

X: PIXEL OF NOTICE
A TO D: REFERENCE PIXEL IN THE SAME IMAGE
F: REFERENCE PIXEL IN ANOTHER FRAME

ENCODING DEVICE, DECODING DEVICE, ENCODING METHOD, DECODING METHOD, AND PROGRAM THEREFOR

BACKGROUND OF THE INVENTION

1. Field of the Invention

The present invention relates to an encoding device and a decoding device which control accesses to encrypted information.

2. Description of the Related Art

An access control to encrypted information is realized by permitting or inhibiting a decoding process to decode code data of the encrypted information itself according to an authentication result, for example.

JP-A-11-313326 discloses an image data compressing device which, with a correlation between frames constituting a motion picture, calculates differential image data between the frames, and selectively compresses and encodes calculated differential image data and input image data (a frame image).

SUMMARY OF THE INVENTION

The present invention has been made under the above-described background, and the present invention provides an encoding device which effectively encodes input image with a correlation between images or a decoding device which decodes code data encoded by the encoding device, and provides an encoding device which encodes an input image and controls an access to encrypted information included in the input image and a decoding device which decodes code data encoded by the encoding device.

According to another aspect of the present invention, an encoding device to encode an object image to be encoded includes a reference information generating unit to generate reference information with respect to a key image different from the object image, and a code generating unit to generate code data of the reference information generated by the reference information generating unit as code data of at least a portion of the object image.

BRIEF DESCRIPTION OF THE DRAWINGS

Embodiments of the present invention will be described in detail based on the following figures, wherein:

FIGS. 1A and 1B are diagrams illustrating a summary of an encoding process, and specifically, FIG. 1A exemplarily shows reference positions which are referred to in an encoding process of an embodiment and FIG. 1B exemplarily and schematically shows code data which is generated by the encoding process of the embodiment;

FIGS. 5A to 5C are diagrams illustrating an encoding process which is made by the encoding program 1005, and specifically, FIG. 5A exemplarily shows pixel positions which are referred to by means of an in-image prediction unit 1510 and a key image prediction unit 1520, FIG. 5B exemplarily shows codes associated with the respective reference pixels, and FIG. 5C exemplarily shows code data which is generated by a code generation unit 1560;

FIG. 7 is a flowchart illustrating an operation of an encoding process (S1010) by means of the encoding program 1005;

FIG. 11A is a diagram exemplarily showing a functional configuration of a key image generation unit 1570 at an encoding side and FIG. 11B is a diagram exemplarily showing a functional configuration of a key image generation unit 1620 at a decoding side;

DETAILED DESCRIPTION OF THE INVENTION

[Encoding Device]

Figure 2A:
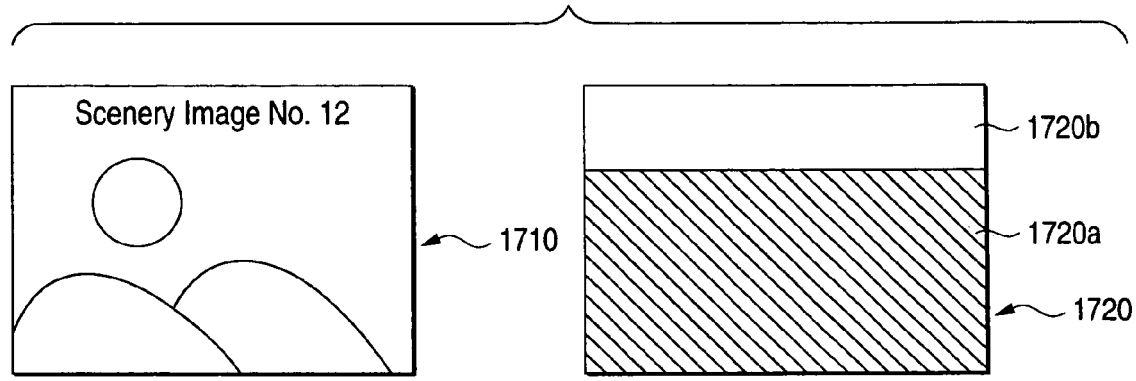
FIGS. 2A and 2B are diagrams illustrating an access control to a partial image, and specifically, FIG. 2A exemplarily shows a key image 1720 which is used for a partial access control and FIG. 2B exemplarily shows a decoded image 1730 to which the partial access control is made.

There is provided an encoding device according to the present invention to encode an object image to be encoded. The encoding device includes a reference information generating unit to generate reference information with respect to a key image different from the object image, and a code generating unit to generate code data of the reference information generated by the reference information generating unit as code data of at least a portion of the object image.

Preferably, the key image includes a nonuniform pattern having nonuniform image data, and the reference information generating unit compares the object image to the key image including the nonuniform pattern and generates the reference information with respect to the key image based on the comparison result.

Preferably, the encoding device further includes a difference calculating unit to calculate a difference between image data of the object image and image data of the key image. Further, the reference information generating unit makes the difference calculated by the difference calculating unit as a part of the reference information with respect to the key image.

Preferably, when encoding an area of notice included in the object image, the reference information generating unit further generates reference information with respect to another area of the object image, and the code generating unit generates code data of the reference information with respect to another area of the object image or code data of the reference information with respect to the key image as code data of the area of notice included in the object image.

Preferably, the encoding device further includes a key image generating unit to generate the key image based on a password. Further, the reference information generating unit compares the key image generated by the key image generating unit to the object image and generates the reference information with respect to the key image according to the comparison result.

Preferably, the encoding device further includes a key image generating unit to generate the key image based on a password, and a key image synthesizing unit to create a synthesized key image based on plural key images generated based on plural passwords by the key image generating unit and layout information of a partial image to be encrypted. Further, the reference information generating unit compares the synthesized key image created by the key image synthesizing unit to the object image and generates reference information with respect to the synthesized key image based on the comparison result.

Preferably, the key image generating unit generates the key image based on the plural passwords hierarchically generated from one full password, the key image synthesizing unit creates one synthesized key image based on the plural key images generated based on the password which is generated from one full password, and the reference information generating unit compares the synthesized key image created based on one full password to the object image and generates the reference information with respect to the synthesized key image.

Preferably, the key image includes a filled area which is filled with the same gray-scale value as an image element to be encrypted, and the reference information generating unit compares the object image including the image element to be encrypted to the key image including the filled area and generates the reference information with respect to the key image for an area the gray-scale value of which matches with the gray-scale value of the image element.

[Decoding Device]

Further, there is provided a decoding device according to the present invention to decode input code data to image data of a decoded image. The decoding device includes a reference data extracting unit to extract image data included in a key image based on input code data, and an image data generating unit to generate image data of at least a portion of the decoded image with image data extracted by the reference data extracting unit.

Preferably, the decoding device further includes a key image generating unit to generate the key image based on a password. Further, the reference data extracting unit extracts image data from the key image generated by the key image generating unit based on input code data.

Preferably, the decoding device further includes a password generating unit to generate plural passwords based on an input password. Further, the key image generating unit generates plural key images based on the plural passwords generated by the password generating unit, and the reference data extracting unit extracts image data from the plural key images generated by the key image generating unit.

[Encoding Method]

Further, there is provided an encoding method according to the present invention to encode an object image to be encoded. The encoding method includes a step of generating reference information with respect to a key image different from the object image, and a step of generating code data of the generated reference information as code data of at least a portion of the object image.

[Decoding Method]

Further, there is provided a decoding method according to the present invention to decode input code data to image data of a decoded image. The decoding method includes a step of extracting image data included in a key image based on input code data, and a step of generating image data of at least a portion of the decoded image with extracted image data.

Further, there is provided an encoding program according to present invention which causes an encoding device to encode an object image to be encoded to execute a step of generating reference information with respect to a key image different from the object image, and a step of generating code data of the generated reference information as code data of at least a portion of the object image.

Further, there is provided a decoding program according to the present invention which causes a decoding device to decode input code data to image data of a decoded image to execute a step of extracting image data included in a key image based on input code data, and a step of generating image data of at least a portion of the decoded image with extracted image data.

According to an encoding device of the present invention, an input image can be encoded with a correlation with a key image and an access to the input image can be controlled according to presence or absence of the key image.

As a method of compressing the amount of data of an input image and controlling an inspection (display or print) of the input image, for example, a method in which a decoding process to decode code data of encrypted information is permitted or inhibited according to an authentication result such as a password authentication is known. However, for example, when setting plural access levels having different inspectable range for one input image, it is necessary to create plural input images having different inspectable range and respectively encode the plural input images created.

Moreover, as a scheme of compressing the input image, a predictive encoding scheme, JPEG, or the like may be used. In the predictive encoding scheme such as an LZ encoding scheme, prediction data is generated with reference to a pixel value of a predefined reference position, and, when generated prediction data matches with image data of a pixel of notice, the reference position of matched prediction data or the like (hereinafter, referred to as reference information) is encoded as code data of the pixel of notice.

FIGS. 1A and 1B are diagrams illustrating a summary of the present embodiment. FIG. 1A exemplarily shows reference positions which are referred to in an encoding process of the present embodiment and FIG. 1B exemplarily and schematically shows code data which is generated by the encoding process of the present embodiment.

When encoding an input image (object image) to be encoded, an image processing device in the present embodiment refers to at least another key image (for example, another frame image) to generate prediction data and performs a predictive encoding process with generated prediction data. That is, the image processing device encodes reference information with respect to another reference image as code data of at least a portion of the object image. More specifically, as exemplarily shown in FIG. 1A, when encoding image data of a pixel of notice X, the image processing device refers to a reference pixel E set on the key image, together with plural reference pixels A to D set on the input image. Here, when image data of the pixel of notice X and image data of one of the reference pixels match with each other, the image processing device encodes identification information (reference information) of the matched reference pixel. When image data of the pixel of notice X does not match with image data of any one of the reference pixels, the image processing device encodes a difference between image data of the reference pixel E and image data of the pixel of notice X.

As exemplarily shown in FIG. 1B, code data generated in such a manner is made of codes corresponding to the respective reference pixels and the difference between the pixel of notice and the reference pixel E (hereinafter, referred to as a prediction error). For example, in FIG. 1B, a code A is a code generated when image data of the pixel of notice X and image data of the reference pixel A match with each other (when the prediction of the reference position A hits). When decoding, the code A serves as data which instructs the application of image data of the reference pixel A.

Similarly, a code E is a code generated when image data of the pixel of notice X and image data of the reference pixel E match with each other. When decoding, the code E refers to the reference pixel E on the key image and instructs the application of image data of the reference pixel E. Therefore, the pixel corresponding to the code E cannot be normally reproduced if the reference pixel E on the key image is not referred to.

Further, in FIG. 1B, a prediction error is a code generated when image data of the pixel of notice X and the pixel value of any one of the reference pixels do not match with each other. When decoding, the prediction error is used as the difference between image data of the reference pixel E and image data of the pixel of notice X. Therefore, if the reference pixel E on the key image is not referred to, the pixel corresponding to the code of the prediction error cannot be normally reproduced.

Therefore, when code data exemplarily shown in FIG. 1B is decoded without referring to the key image, the pixels corresponding to the code E and the prediction error are not reproduced and a scramble decoded image is generated. On the other hand, if code data is encoded in a state in which the key image can be referred to, the pixels corresponding to the code E and the prediction error are reproduced, such that the input image is reproduced. Specifically, according to presence or absence of the key image, the access to the input image is controlled.

As such, the image processing device in the present embodiment refers to the key image to perform the predictive encoding on the input image, such that the access to the input image can be controlled.

Figure 2B:
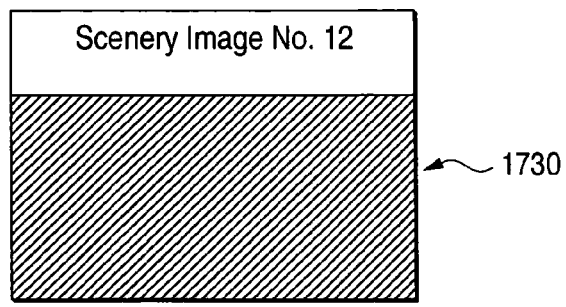

FIGS. 2A and 2B are diagrams illustrating the access control to a partial image (hereinafter, referred to as a partial access control). FIG. 2A exemplarily shows a key image 1720 which is used for the partial access control and FIG. 2B exemplarily shows a decoded image 1730 to which the partial access control is made.

As exemplarily shown in FIG. 2A, when performing the partial access control to an input image 1710, the image processing device uses the key image 1720 according to an area, on which the access control is performed, to encode the input image 1710. The key image 1720 is made of a noise area 1720a corresponding to the area suffered from the access control and a header area 1720b corresponding to an area which is not suffered from the access control. The noise area 1720a is made of nonuniform image data, for example, a random number sequence generated based on a password. Accordingly, in an image area corresponding to the noise area 1720a, the pixel value of the reference pixel E exemplarily shown in FIG. 1A randomly matches with the pixel value of the pixel of notice X, and high scramble effect can be expected. Further, in the image area corresponding to the noise area 1720a, the prediction error is the different between the reference pixel E having a random value and the pixel of notice X, and thus it may be further difficult to infer the pixel of notice X.

Further, the header area 1720b is made of uniform image data, for example, only image data of white. Accordingly, in an image area corresponding to the header area 1720b, the pixel value of the reference pixel E exemplarily shown in FIG. 1A matches with that of the pixel of notice X of white and the pixel value of the pixel of notice X is reproduced by performing the decoding process with reference to the white image. Further, in the image area corresponding to the header area 1720b, the prediction error is the difference between the reference pixel E having a constant value (in this embodiment, 0) and the pixel of notice X and the pixel value of the pixel of notice X is reproduced by performing the decoding process with reference to the white image.

As described above, the image processing device in the present embodiment encodes the input image with the predictive encoding scheme which refers to the key image, such that the access control and data compression to the input image are realized.

Next, a hardware configuration of an image processing device 2 will be described.

Figure 3:
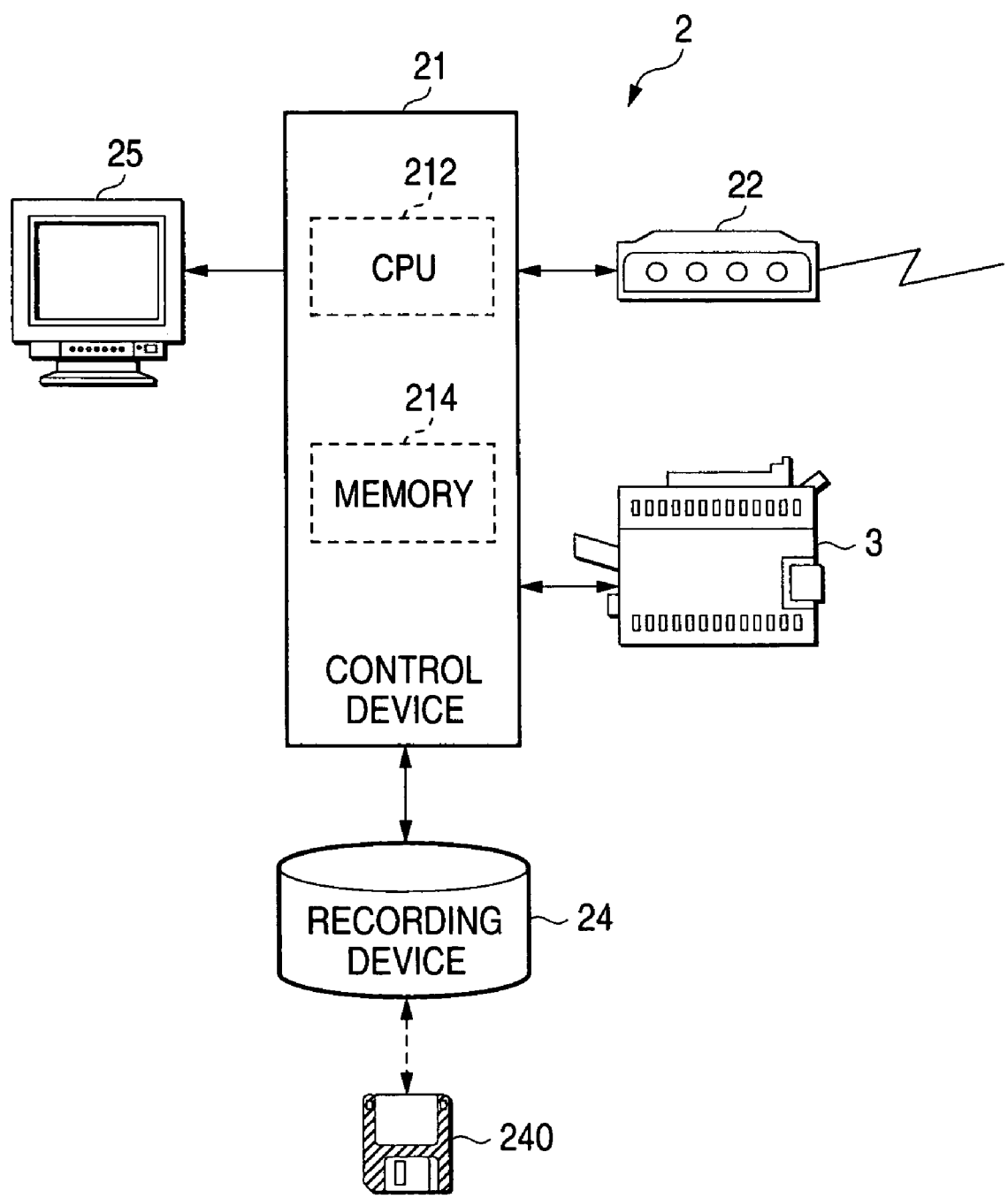
FIG. 3 is a diagram illustrating the hardware configuration of the image processing device.

FIG. 3 is a diagram exemplarily showing the hardware configuration of the image processing device 2 to which an encoding method and a decoding method according to the present invention is applied, with laying emphasis on a control device 21.

As exemplarily shown in FIG. 3, the image processing device 2 has the control device 21 having a CPU 212, a memory 214, and so on, a communication device 22, a recording device 24 such as a HDD or CD device, and a user interface device (a UI device) 25 having an LCD display device or a CRT display device, a keyboard or a touch panel, and so on.

For example, the image processing device 2 is a general computer in which an encoding program 5 (described later) and a decoding program 6 according to the present invention (described later) are installed as a part of a printer driver. The image processing device 2 acquires image data via the communication device 22, the recording device 24, or the like, encodes or decodes acquired image data, and transmits encoded or decoded data to a printer device 3.

Hereinafter, a specified example of an aspect in which the partial access control to the input image 1710 is performed with the key image 1720 including the noise area 1720a will be described.

[Encoding Program]

Figure 4:
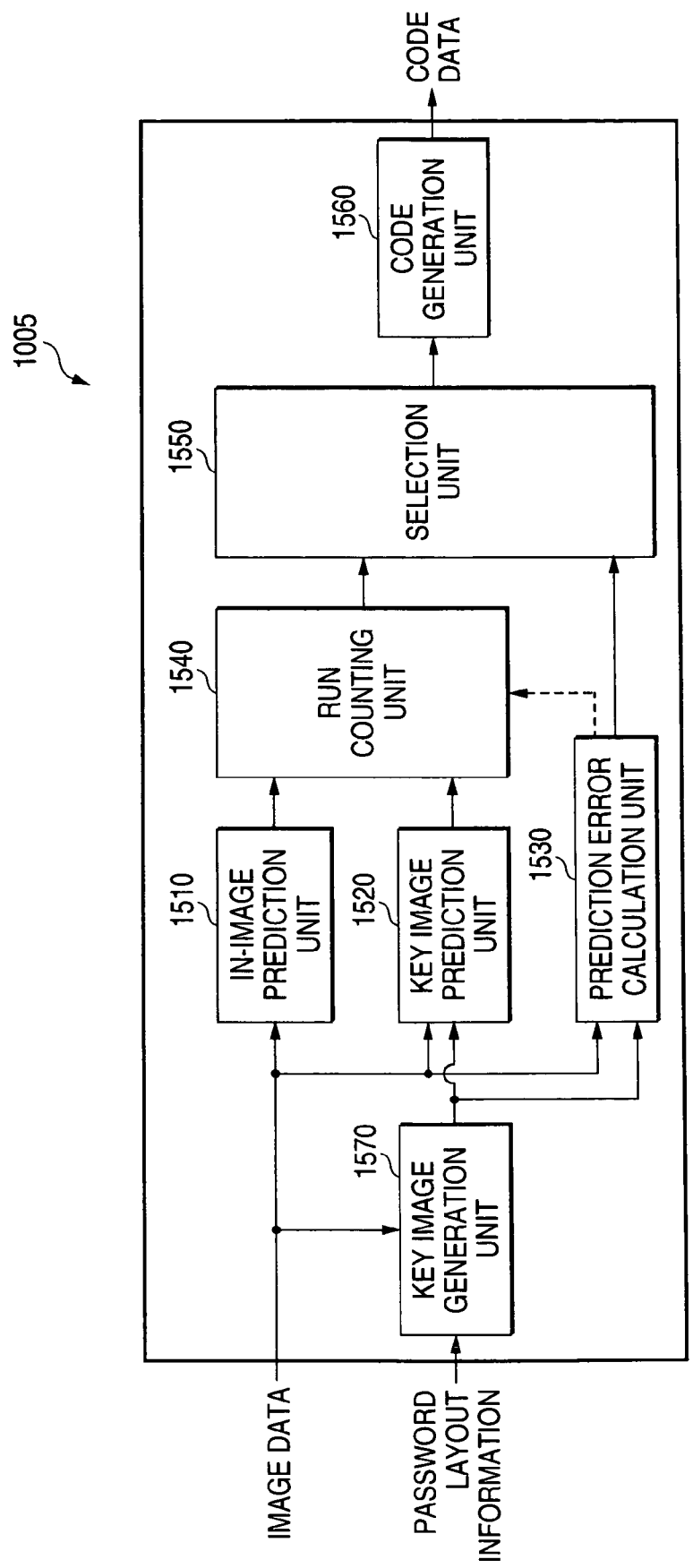
FIG. 4 is a diagram exemplarily showing a functional configuration of an encoding program 1005 which is executed by a control device 21 (FIG. 3) and realizes an encoding method according to the present invention.

FIG. 4 is a diagram exemplarily showing a functional configuration of an encoding program 1005 which is executed by the control device 21 (FIG. 3) and realizes an encoding method according to the present invention.

As exemplarily shown in FIG. 4, the encoding program 1005 has the in-image prediction unit 1510, the key image prediction unit 1520, a prediction error calculation unit 1530, a run counting unit 1540, a selection unit 1550, a code generation unit 1560, and a key image generation unit 1570. Moreover, a combination of the in-image prediction unit 1510, the key image prediction unit 1520, the prediction error calculation unit 1530, the run counting unit 1540, and the selection unit 1550 is an example of a reference information generating unit according to the present invention.

In the encoding program 1005, image data is input via the communication device 22, the recording device 24, or the like. Input image data is rasterized in a previous stage of the encoding program 1005.

The in-image prediction unit 1510 refers to a pixel value of a pixel different from the pixel of notice on the input image 1710 (FIG. 2A) to be encoded, sets the pixel value to a prediction value, and outputs the comparison result of the prediction value and the pixel value of the pixel of notice to the run counting unit 1540. The in-image prediction unit 1510 in this embodiment compares the pixel value of each of the reference pixels A to D (FIG. 1A) to the pixel value of the pixel of notice X (FIG. 1A) and, when the pixel value of one of the reference pixels A to D matches with the pixel value of the pixel of notice X (that is, when the prediction hits), outputs a prediction unit ID (described later) to identify itself to the run counting unit 1540. However, when the pixel value of any one of the reference pixels A to D does not match with the pixel value of the pixel of notice X, the in-image prediction unit 1510 outputs a purport that they do not match with each other to the run counting unit 1540. Moreover, the in-image prediction unit 1510 may refers to one or more reference pixels. For example, the in-image prediction unit 1510 may refer to only the reference position A and output the comparison result of the pixel values.

The key image prediction unit 1520 refers to a pixel value of another image (the key image 1720) different from the input image 1710 to be encoded, sets the pixel value of the key image 1720 to a prediction value, outputs the comparison result of the prediction value and the pixel value of the pixel of notice (the pixel included in the input image) to the run counting unit 1540. The key image prediction unit 1520 of this embodiment compares the pixel value of the reference pixel E (FIG. 1) included in the key image 1720 to the pixel value of the pixel of notice X and, when the pixel values match with each other (that is, when the prediction hits), outputs the prediction unit ID (described later) to identify itself to the run counting unit 1540. In other cases, the key image prediction unit 1520 outputs a purport that they do not match with each other to the run counting unit 1540. The relative position of the reference pixel E on the key image 1720 corresponds to the relative position of the pixel of notice X on the input image 1710. For example, when the resolution of the input image 1710 and the resolution of the key image 1720 match with each other, the relative position of the reference pixel E and the relative position of the pixel of notice X are the same. That is, when the input image 1710 overlaps the key image 1720, the reference pixel E overlaps the pixel of notice X.

The prediction error calculation unit 1530 predicts the pixel value of the pixel of notice with a previously given prediction method, subtracts the prediction value from an actual pixel value of the pixel of notice, and outputs the subtraction result to the run counting unit 1540 and the selection unit 1550 as a prediction error value. The prediction method of the prediction error calculation unit 1530 may correspond to a prediction method of the decoding program 1006 (described later) which decodes code data. In order to increase the scramble effect, preferably, the prediction error calculation unit 1530 refers the pixel on the key image 1720 and sets the difference between the pixel value of the reference pixel and the pixel value of the pixel of notice as the prediction error value. Therefore, the prediction error calculation unit 1530 of this embodiment sets the pixel value of the same reference position (the reference pixel E) as that of the key image prediction unit 1520 to a prediction value and calculates the difference between the prediction value and the actual pixel value (the pixel value of the pixel of notice X) as the prediction error value.

The run counting unit 1540 counts the consecutive number of the same prediction unit ID and outputs the prediction unit ID and the consecutive number to the selection unit 1550. The prediction unit ID and the consecutive number are examples of reference information to the input image 1710 and the key image 1720. For example, when the prediction error value is input, the run counting unit 1540 outputs the prediction unit ID and the consecutive number which are counted with an internal counter, and then outputs the input prediction error value to the selection unit 1550 as it is.

The selection unit 1550 selects the prediction unit ID being consecutive to the longest based on the prediction unit ID, the consecutive number, and the prediction error value input from the run counting unit 1540 and outputs the prediction unit ID, the consecutive number, and the prediction error value to the code generation unit 1560 as prediction data.

The code generation unit 1560 encodes the prediction unit ID, the consecutive number, and the prediction error value input from the selection unit 1550 and outputs them to the communication device 22, the recording device 24, or the like. In addition, when the partial access control is performed, the code generation unit 1560 outputs layout information designating an image area, to which the access control is to be performed, with being appended to code data.

The key image generation unit 1570 generates the key image 1720 based on an input password and outputs the generated key image 1720 to the key image prediction unit 1520 and the prediction error calculation unit 1530. In addition, when the image area to be suffered from the access control is designated by the layout information, the key image generation unit 1570 generates the key image 1720 (FIG. 2A) based on the password and the layout information. For example, the key image generation unit 1570 generates a random number with the input password as an argument, generates the noise area 1720a (FIG. 2A) having the generated random number as the pixel value, and arranges the generated noise area 1720a according to the layout information, such that the key image 1720 is generated.

The generated random number is not necessarily a complete random number. For example, a random number generated with a pseudo random number function may be used. In this case, by using the random number generated with the pseudo random number function, the amount of data can be further compressed as compared to the complete random number, such that the amount of data of the key image 1720 can be suppressed.

FIGS. 5A to 5C are diagram illustrating the encoding process which is made by the encoding program 1005. FIG. 5A exemplarily shows pixel positions which are referred to by means of the in-image prediction unit 1510 and the key image prediction unit 1520, FIG. 5B exemplarily shows codes associated with the respective reference pixels, and FIG. 5C exemplarily shows code data which is generated by the code generation unit 1560.

As exemplarily shown in FIG. 5A, the reference positions of the in-image prediction unit 1510 and the key image prediction unit 1520 are set to relative positions to the pixel of notice X. Specifically, the reference pixel A of the in-image prediction unit 1510 is set at an upstream in a main scanning direction of the pixel of notice X and the reference pixels B to D are set on a main scanning line above the pixel of notice X (an upstream in a sub scanning direction). Further, the reference pixel E of the key image prediction unit 1520 is set on another image (the key image 1720) different from the input image 1710.

Further, as exemplarily shown in FIG. 5B, a priority is set to the respective reference pixels A to E. When the prediction hits with the plural reference pixels, the run counting unit 1540 (FIG. 4) increase the consecutive number of the prediction unit ID according to the set priority. From a viewpoint of increasing the scramble effect, the priority of the reference pixel E to which the key image prediction unit 1520 refers is preferably higher than those of the reference pixels A to D to which the in-image prediction unit 1510 refers.

Further, as exemplarily shown in FIG. 5B, the code generation unit 1560 associates the prediction units (the reference positions) with the codes and outputs the code corresponding to the reference position having the pixel value which matches with the pixel value of the pixel of notice X. Moreover, the codes associated with the respective reference positions are entropy codes set according to the hitting ratio of the respective reference positions, each having a code length corresponding to the priority.

Further, when the pixel values consecutively match with each other at the same reference position, the code generation unit 1560 encodes the consecutive number which is counted with the run counting unit 1540. Accordingly, the code amount becomes small. As such, as shown in exemplarily shown in FIG. 5C, when the pixel values match with each other at one of the reference positions, the encoding program 1005 encodes the code corresponding to the reference position and the consecutive number that the pixel values match each other at the reference position. To the contrary, when the pixel values do not match with each other at any one of the reference positions, the code generation unit 1560 encodes the difference (the prediction error value) between the pixel value of the predefined reference position (the reference pixel E) and the pixel value of the pixel of notice X.

Figure 6A:
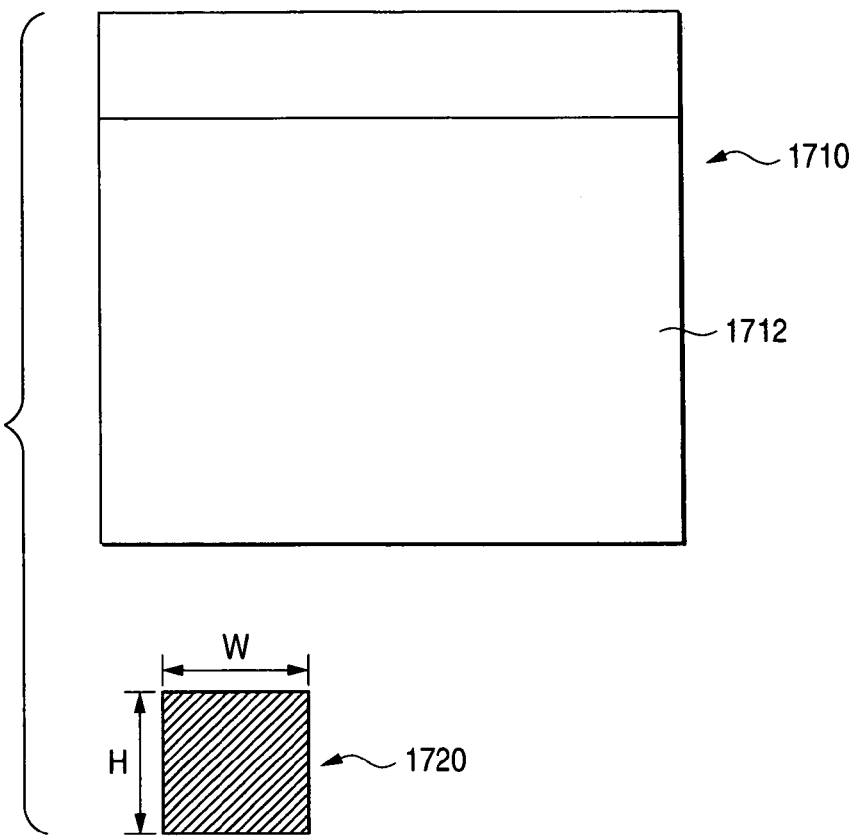
FIGS. 6A and 6B are diagrams illustrating a method of referring to the key image 1720 when the resolution of an input image 1710 is higher than the resolution of the key image 1720.
Figure 6B:
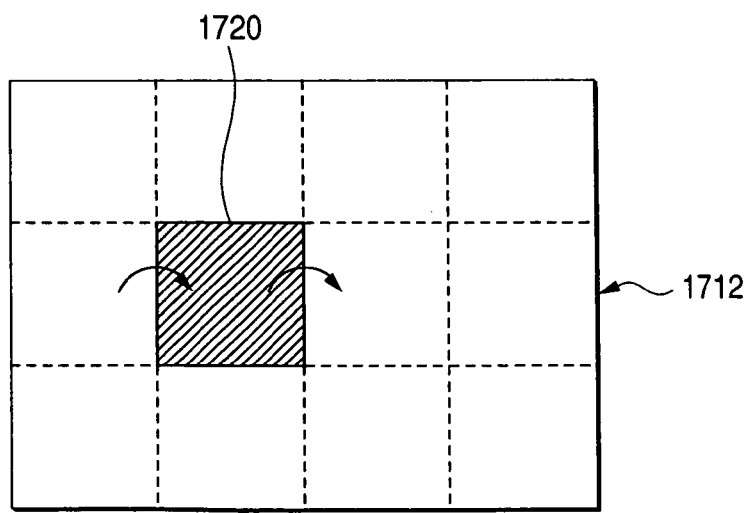

FIGS. 6A and 6B are diagrams illustrating a method of referring to the key image 1720 when the resolution of the input image 1710 is higher than the resolution of the key image 1720.

As exemplarily shown in FIG. 6A, there is a case in which the resolution (the number of the pixels) of an area to be encrypted (an encryption object area 1712) on the input image 1710 is higher than that of the key image 1720. In the key image 1720 of this embodiment, the number of the pixels in the main scanning direction is W and the number of the pixels in the sub scanning direction is H. That is, the key image 1720 has the number of the pixels smaller than that of the encryption object area 1712 in the main scanning direction and the sub scanning direction.

In this case, as exemplarily shown in FIG. 6B, the key image prediction unit 1520 repetitively applies the key image 1720 in the encryption object area 1712. Specifically, the key image prediction unit 1520 sets a remainder obtained by dividing a coordinate (x, y) of the pixel of notice in the encryption object area 1712 by (W, H) to the reference position in the key image 1720. Moreover, similarly, when the resolution of the key image 1720 is smaller than that of the decoded image, the decoding program 1006 (described later) repetitively refers to the key image 1720 to perform the decoding process.

FIG. 7 is a flowchart illustrating an operation of an encoding process (S1010) by means of the encoding program 1005.

As shown in FIG. 7, in a step 1100 (S1100), the encoding program 1005 receives the input image 1710 to be encoded, the layout information which designates the encryption object area 1712, and the password from a user.

In a step 1110 (S1110), the key image generation unit 1570 generates the random number sequence with the input password as the argument, generates the noise area 1720a (FIG. 2A) having the generated random number sequence as the pixel value, and arranges the generated noise area 1720a according to the layout information, thereby generating the key image 1720. The key image 1720 generated in such a manner is input to the key image prediction unit 1520 and the prediction error calculation unit 1530.

In a step 1120 (S1120), the in-image prediction unit 1510 and the key image prediction unit 1520 set the pixel of notice X in a raster scanning sequence on the input image 1710 and perform the prediction process (the comparison process between the pixel value of the pixel of notice and the pixel value of the reference pixel) to the set pixel of notice X. Specifically, the in-image prediction unit 1510 compares the pixel value of each of the plural reference pixels A to D exemplarily shown in FIG. 5A to the pixel value of the pixel of notice X and, when the pixel values match with each other, outputs the prediction unit ID to identify itself to the run counting unit 1540. In other case, the in-image prediction unit 1510 outputs a purport that they do not match with each other to the run counting unit 1540. Further, the key image prediction unit 1520 compares the pixel value of the reference pixel E (FIG. 5) included in the key image 1720 to the pixel value of the pixel of notice X and, when the pixel values match with each other, outputs the prediction unit ID (described later) to identify itself to the run counting unit 1540. In other cases, the key image prediction unit 1520 outputs a purport that they do not match with each other to the run counting unit 1540.

In a step 1130 (S1130), the run counting unit 1540 counts the consecutive number of the prediction unit ID input from the in-image prediction unit 1510 or the key image prediction unit 1520 and outputs the prediction unit ID and the consecutive number of the prediction unit ID to the selection unit 1550 as the reference information.

Further, the prediction error calculation unit 1530 sets the pixel value of the reference pixel E as the prediction value, calculates the difference between the prediction value and the pixel value of the pixel of notice X as the prediction error value, and outputs the calculated prediction error value to the selection unit 1550 as the reference information.

The selection unit 1550 selects the prediction unit ID being consecutive to the longest based on the prediction unit ID and the consecutive number input from the run counting unit 1540, or the prediction error value input from the prediction error calculation unit 1530 and outputs the prediction unit ID, the consecutive number, and the prediction error value to the code generation unit 1560 as prediction data.

In a step 1140 (S1140), the code generation unit 1560 encodes the prediction unit ID, the consecutive number, and the prediction error value input from the selection unit 1550.

In a step 1150 (S1150), the encoding program 1005 determines whether or not all the pixels of the input image 1710 are encoded. When all the pixels are encoded, the process progresses to a step 1160 (S1160). In other cases, the process returns to the step 1120 (S1120), and a next pixel of notice X is encoded.

In the step 1160 (S1160), the code generation unit 1560 appends the layout information to generated code data and output it to the communication device 22, the recording device 24, or the like.

As such, the encoding program 1005 encodes the input image 1710 with reference to the key image 1720.

[Decoding Program]

Figure 8:
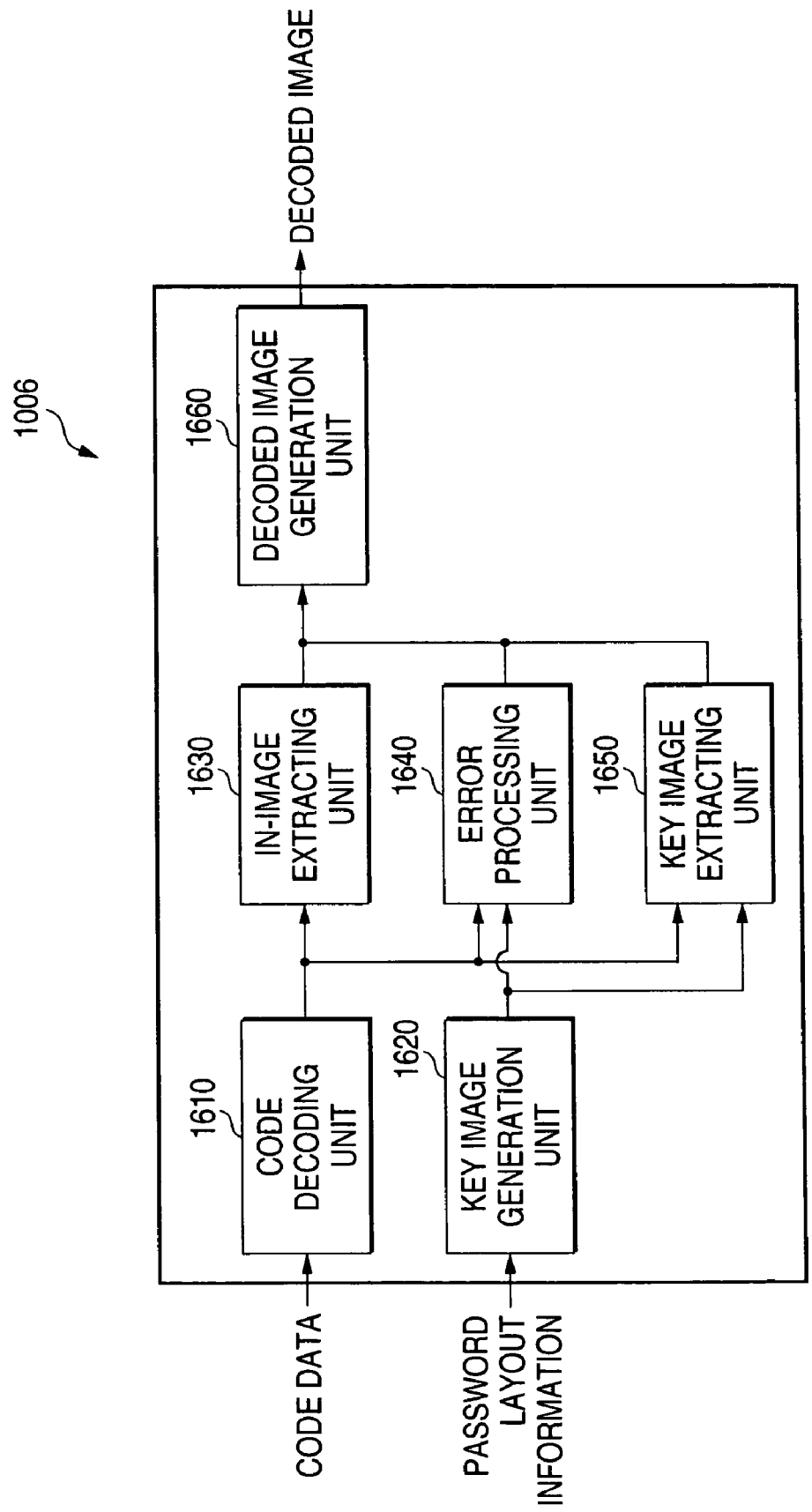
FIG. 8 is a diagram exemplarily showing a functional configuration of a decoding program 1006 which is executed by the control device 21 (FIG. 3) and realizes a decoding method according to the present invention.

FIG. 8 is a diagram exemplarily showing a functional configuration of a decoding program 1006 which is executed by the control device 21 (FIG. 3) and realizes a decoding method according to the present invention.

As exemplarily shown in FIG. 8, the decoding program 1006 has a code decoding unit 1610, a key image generation unit 1620, an in-image extracting unit 1630, an error processing unit 1640, a key image extracting unit 1650, and a decoded image generation unit 1660.

In the decoding program 1006, as exemplarily shown in FIG. 5B, the code decoding unit 1610 has a table associating the codes with the prediction unit IDs (reference positions) and specifies the reference position based on input code data. Further, the code decoding unit 1610 also decodes numeric values such as the consecutive number of the prediction unit IDs or the prediction error based on input code data.

The reference position, the consecutive number, and the prediction error (that is, reference information) decoded in such a manner are input to the in-image extracting unit 1630, the error processing unit 1640, and the key image extracting unit 1650.

The key image generation unit 1620 generates the key image 1720 based on the input password by means of the method identical to the key image generation unit 1570 at the encoding side and outputs the generated key image 1720 to the error processing unit 1640 and the key image extracting unit 1650. Further, when the layout information is appended to code data, the key image generation unit 1620 generates the key image 1720 based on the password and the layout information. For example, the key image generation unit 1620 generates the random number with the input password as the argument, generates the noise area 1720a (FIG. 2A) having the generated random number as the pixel value, arranges the generated noise area 1720a according to the layout information, thereby generating the key image 1720.

Moreover, when the password is not input, the key image generation unit 1620 of this embodiment generates the key image 1720 (the key image made of uniform gray-scale data) in which the pixel values of all of the pixels are 0 (zero) and outputs it to the error processing unit 1640 and the key image extracting unit 1650.

When the prediction unit ID input from the code decoding unit 1610 corresponds to one of the reference positions in the input image (that is, when corresponding to one of the reference pixels A to D), the in-image extracting unit 1630 refers to the pixel of the corresponding reference position and outputs the pixel value of the reference pixel to the decoded image generation unit 1660 as decoded data. Further, when the consecutive number is input together with the prediction unit ID, the in-image extracting unit 1620 associates the corresponding pixel value with the prediction unit ID and outputs the consecutive number to the decoded image generation unit 1660.

If the prediction error is input from the code decoding unit 1610, the error processing unit 1640 outputs the pixel value corresponding to the input prediction error to the decoded image generation unit 1670 as decoded data. The error processing unit 1640 of this embodiment adds the input prediction error and the pixel value of the pixel (the reference pixel E) on the key image 1720 to generate decoded data.

When the prediction unit ID input from the code decoding unit 1610 corresponds to the reference position (the reference pixel E) on the key image 1720, the key image extracting unit 1650 refers to the pixel of the key image 1720 to extract the pixel value of the pixel and outputs the extracted pixel value and the input consecutive number to the decoded image generation unit 1660.

The decoded image generation unit 1660 generates the decoded image based on decoded data input from the in-image extracting unit 1630, decoded data input from the error processing unit 1640, and decoded data input from the key image extracting unit 1650. More specifically, when decoded data (the pixel value and the consecutive number) is input from the in-image extracting unit 1630, the decoded image generation unit 1660 consecutively arranges the pixels having the input pixel value by the consecutive number. Further, when decoded data (the sum of the pixel value of the reference pixel E and the prediction error value) is input from the error processing unit 1640, the decoded image generation unit 1660 arranges the pixels having the sum as the pixel value. Further, when decoded data (the pixel value and the consecutive number) is input from the key image extracting unit 1650, the decoded image generation unit 1660 consecutively arranges the pixels having the input pixel value by the consecutive number. A group of pixels arranged in such a manner constitutes the decoded image.

Figure 9:
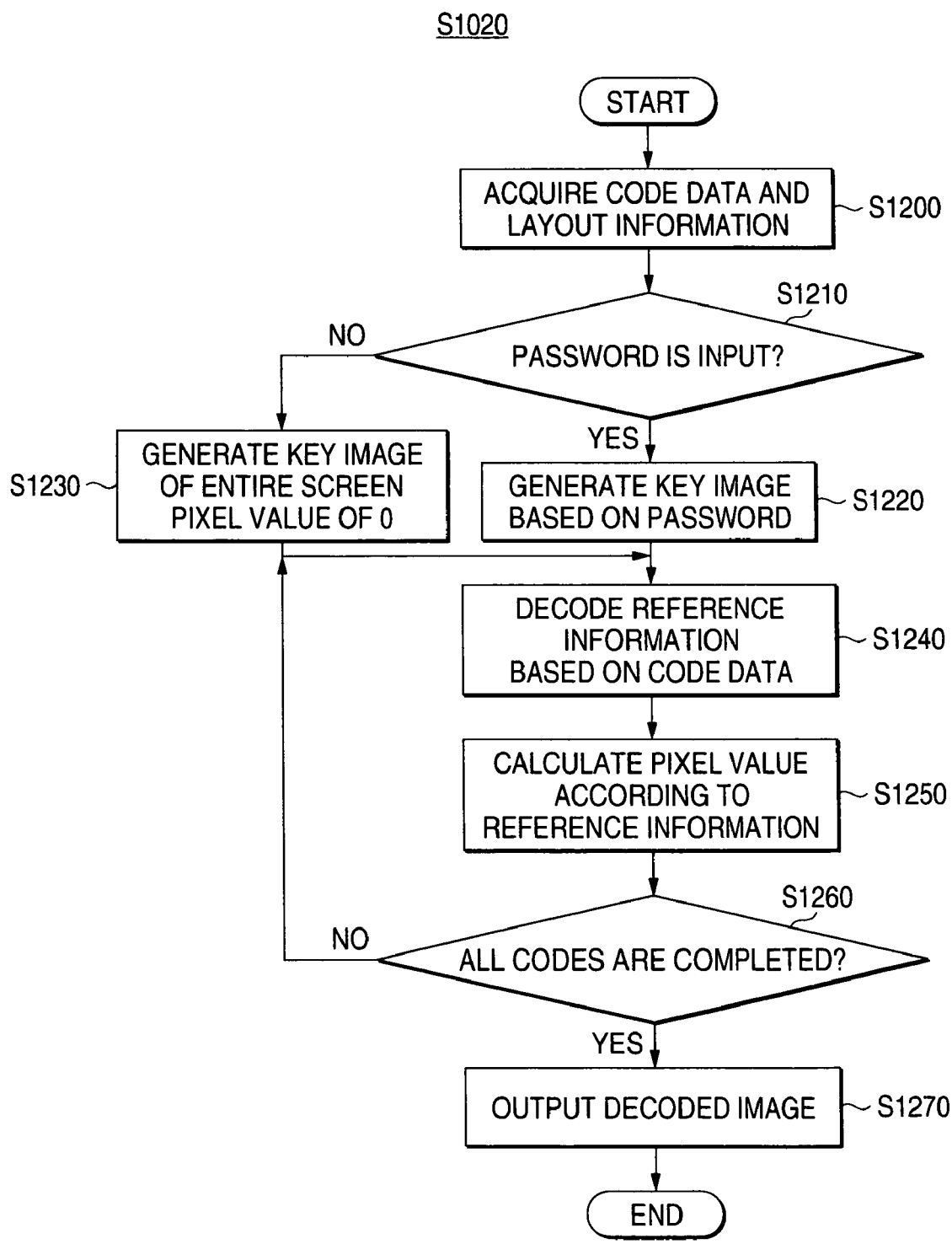
FIG. 9 is a flowchart illustrating an operation of a decoding process (S20) by means of the decoding program 1006.

FIG. 9 is a flowchart illustrating an operation of a decoding process (S20) by means of the decoding program 1006.

As shown in FIG. 9, in a step 1200 (S1200), the decoding program 1006 acquires code data to be decoded and the layout information appended to code data from the user.

In a step 1210 (S1210), the key image generation unit 1620 requests the user to input the password. When the password is input, the decoding program 1006 progresses the process to a step 1220 (S1220). To the contrary, when the password is not input, the process progresses to a step 1230 (S1230).

In the step 1220 (S1220), the key image generation unit 1620 generates the random number sequence with the input password as the argument, generates the noise area 1720a (FIG. 2A) having the generated random number sequence as the pixel value, and arranges the generated noise area 1720a according to the layout information, thereby generating the key image 1720. The key image 1720 generated in such a manner is input to the error processing unit 1640 and the key image extracting unit 1650.

In the step 1230 (S1230), the key image generation unit 1620 generates the key image 1720 in which the pixel values of all of the pixels are 0 (zero) and outputs the generated key image 1720 to the error processing unit 1640 and the key image extracting unit 1650.

In a step 1240 (S1240), the code decoding unit 1610 sequentially decodes the codes included in input code data and outputs decoded reference information (the prediction unit ID, the consecutive number, or the prediction error value) to the in-image extracting unit 1630, the error processing unit 1640, and the key image extracting unit 1650.

In a step 1250 (S1250), the in-image extracting unit 1630, the error processing unit 1640, or the key image extracting unit 1650 calculates the pixel value according to the reference information (the prediction unit ID, the consecutive number, or the prediction error value) input from the code decoding unit 1610 and outputs the calculated pixel value to the decoded image generation unit 1660.

Specifically, when the prediction unit ID input from the code decoding unit 1610 corresponds to one of the reference pixels A to D, the in-image extracting unit 1630 refers to the pixel of the corresponding reference position to extract the pixel value of the pixel and outputs the extracted pixel value and the input consecutive number to the decoded image generation unit 1660 as decoded data. Further, when the prediction error value is input from the code decoding unit 1610, the error processing unit 1640 adds the input prediction error value and the pixel value of the reference pixel E to generate decoded data and outputs it to the decoded image generation unit 1660. Further, when the prediction unit ID input from the code decoding unit 1610 corresponds to the reference pixel E, the key image extracting unit 1650 refers to the reference pixel E to extract the pixel value of the pixel and outputs the extracted pixel value and the input consecutive number to the decoded image generation unit 1660.

In a step 1260 (S1260), the decoding program 1006 determines whether or not the step 1240 (S1240) and the step 1250 (S1250) are completed for all code data. When the steps are completed for all code data, the process progresses to a step

1270 (S1270). In other cases, the process returns to the step 1240 (S1240) and next code data is processed.

In the step 1270 (S1270), when decoded data (the pixel value and the consecutive number) is input from the in-image extracting unit 1630, the decoded image generation unit 1660 arranges the pixels having the input pixel value by the consecutive number. When decoded data (the sum of the pixel value of the reference pixel E and the prediction error value) is input from the error processing unit 1640, the decoded image generation unit 1660 arranges the pixels having the sum as the pixel value. Further, when decoded data (the pixel value and the consecutive number) is input from the key image extracting unit 1650, the decoded image generation unit 1660 arranges the pixels having the input pixel value by the consecutive number. The group of pixels arranged in such a manner constitutes the decoded image.

As such, the decoding program 1006 generates the key image 1720 based on the input password and refers to the generated key image according to code data to reproduce the decoded image. Therefore, when an inadequate password is input or when the password is not input, a key image different from the key image used when encoding is generated by the key image generation unit 1620, and thus the encryption object area 1712 of the input image 1710 is decoded with having been scrambled.

As described above, the image processing device 2 in the present embodiment encodes the input image 1710 to be encoded with reference to another key image 1720, and thus can control the access to the input image 1710 according to presence or absence of the key image 1720.

[First Modification]

Next, a modification of the first embodiment will be described.

Figure 10A:
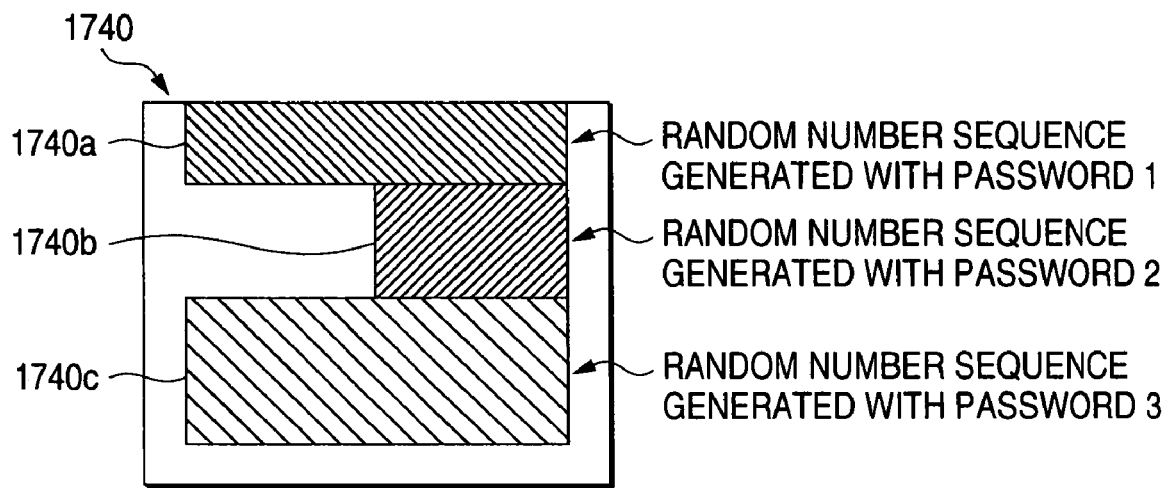
FIGS. 10A and 10B are diagrams illustrating a method of realizing an access control according to access levels.
Figure 10B:
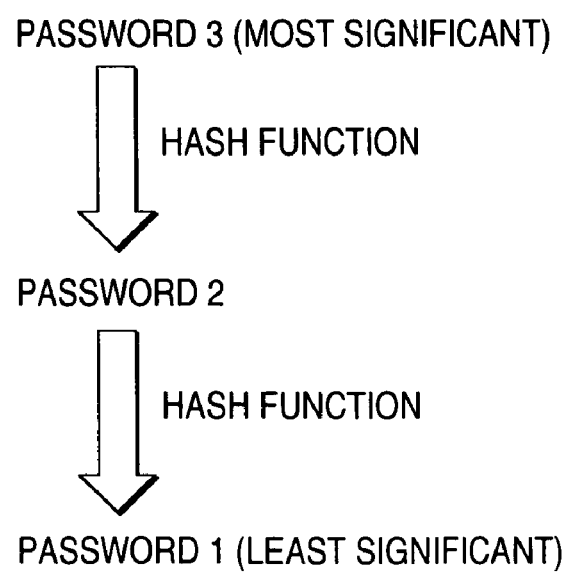

FIGS. 10A and 10B are diagrams illustrating a method of realizing an access control according to access levels. Here, the access levels means hierarchical access authority in which accessible ranges are different from each other.

As exemplarily shown in FIG. 10A, the key image applied to this embodiment is a synthesized key image 1740 in which plural noise areas 1740a to 1740c are provided. The noise areas 1740a to 1740c provided in the synthesized key image 1740 are made of the random number sequence generated based on different passwords from each other. For example, the first noise area 1740a is made of the random number sequence generated with the password 1 having the lowest access level. Further, the second noise area 1740b is made of the random number sequence generated with the password 2 having the access level higher than that of the password 1, and the third noise area 1740c is made of the random number sequence generated with the password 3 having the access level higher than that of the password 2.

As exemplarily shown in FIG. 10B, these passwords are in a hierarchical relationship corresponding to the access levels. That is, the low-level password (that is, the password having a lower access level) can be generated from the high-level password (that is, the password having a higher access level). More specifically, the password 1 can be a hash value of the password 2 and thus can be uniquely calculated based on the password 2. However, actually, it is impossible to uniquely calculate the password 2 based on the password 1. Similarly, the password 3 constitutes a hash value of the password 2.

Therefore, a user having the password 3 can generate the password 2 and the password 1 based on the password 3, and thus the synthesized key image 1740 including all the noise areas (the first noise area 1740a to the third noise area 1740c) can be generated.

On the other hand, a user having the password 1 cannot generate the password 2 and the password 3, and thus the synthesized key image 1740 only including the first noise area 1740a can be generated.

As such, the image processing device 2 of the present modification encodes the input image 1710 with the synthesized key image 1740 including all the noise areas 1740a to 1740c and thus it permits the access to the input image 1710 within the range according to a hierarchy of each of the passwords distributed to the respective users. That is, the image processing device 2 performs the access control to the input image 1710 according to the access levels.

FIG. 11A is a diagram exemplarily showing the functional configuration of the key image generation unit 1570 at the encoding side in the present modification and FIG. 11B is a diagram exemplarily showing the functional configuration of the key image generation unit 1620 at the decoding side in the present modification.

As exemplarily shown in FIG. 11A, the key image generation unit 1570 of the encoding program 1005 has a password generation unit 1572, a key image production unit 1574, and a key image synthesizing unit 1576.

In the key image generation unit 1570 at the encoding side, the password generation unit 1572 generates the low-level password based on the input password and outputs the input password (the most significant password) and the generated low-level password to the key image production unit 1574. The password generation unit 1572 of this embodiment recursively calculates the hash value (the low-level password) with the input password as an initial value by means of the hash function.

The low-level password generated by the key image generation unit 1570 is displayed on the UI device 25 (FIG. 3) or the like to be notified to a user.

The key image production unit 1574 generates the noise areas 1740a to 1740c (the key image) based on the respective passwords (the most significant password and the low-level password) input from the password generation unit 1572 and output the generated noise areas to the key image synthesizing unit 1576.

The key image synthesizing unit 1576 arranges the plural noise areas 1740a to 1740c (associated with the hierarchy of the password) input from the key image production unit 1574 according to the layout information and generates the synthesized key image 1740 (FIG. 10A).

The generated synthesized key image 1740 is input to the key image prediction unit 1520 (FIG. 4) and the prediction error calculation unit 1530 (FIG. 4) and is used for the encoding process.

As exemplarily shown in FIG. 11B, the key image generation unit 1620 of the decoding program 1006 has a password generation unit 1622, a key image production unit 1624, and a key image synthesizing unit 1626.

In the key image generation unit 1620 at the decoding side, the password generation unit 1622 generates the low-level password based on the input password by means of the method identical to the password generation unit 1572 at the encoding side and outputs the input password and the generated low-level password to the key image production unit 1624.

The key image production unit 1624 generates the noise area 1740a and so on based on the respective passwords (the input password and the low-level password) input from the password generation unit 1622 and outputs the generated noise areas to the key image synthesizing unit 1626.

The key image synthesizing unit 1626 arranges the plural noise areas 1740a and so on input from the key image production unit 1624 according to the layout information and generates the synthesized key image 1740. The generated synthesized key image 1740 includes the noise area 1740*a* and so on corresponding to the hierarchy (the access levels) of the input passwords. The synthesized key image 1740 is input to the error processing unit 1640 (FIG. 8) and the key image extracting unit 1650 (FIG. 8) and is used for the decoding process.

As such, the image processing device 2 of the present modification creates the synthesized key image 1740 by using a group of passwords which are in a hierarchical relationship and encodes the input image 1710 by using the created synthesized key image 1740, and thus the access to the input image 1710 can be hierarchically controlled.

[Second Modification]

Further, the image processing device 2 arranges the random number sequences generated based on the passwords in a lattice shape to generate a second synthesized key image 1742, such that the resolution of the decoded image can be controlled.

Figures 12A, 12B:
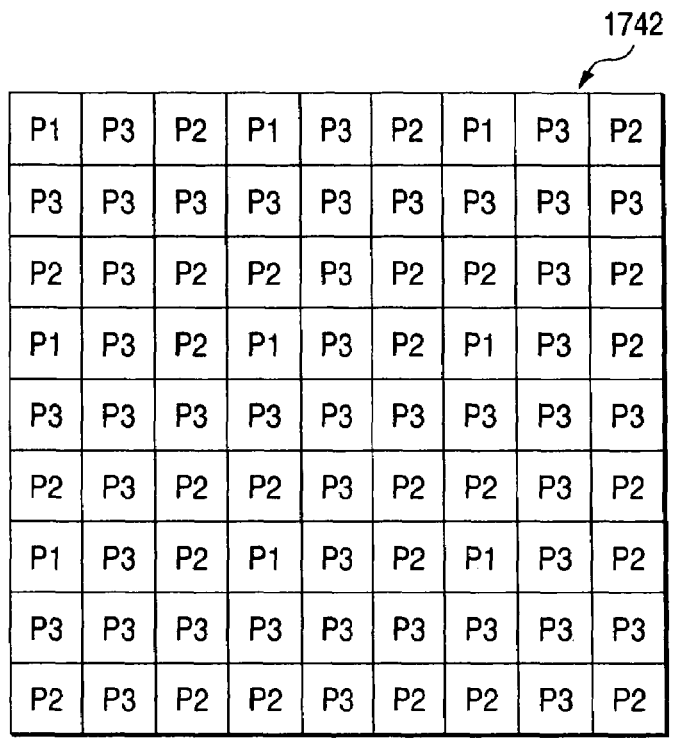
FIGS. 12A and 12B are diagrams illustrating a resolution control by a second synthesized key image 1742.

FIGS. 12A and 12B are diagrams illustrating a resolution control by the second synthesized key image 1742.

For example, as exemplarily shown in FIG. 12A, the key image generation unit 1570 in the encoding program 1005 arranges the random number sequences generated with the respective passwords in the lattice shape to generate the synthesized key image 1742. Moreover, in FIGS. 12A and 12B, 'P1' represents pixels to which the random number generated with the password 1 is applied, 'P2' represents pixels to which the random number generated with the password 2 is applied, and 'P3' represents pixels to which the random number generated with the password 3 is applied.

When code data encoded with reference to the synthesized key image 1742 generated in such a manner is decoded by using, for example, the password 1 and the password 2, as exemplarily shown in FIG. 12B, the group of pixels of 'P1' corresponding to the password 1 and the group of pixels of 'P2' corresponding to the password 2 are normally decoded, while the group of pixels of 'P3' corresponding to the password 3 is not decoded normally. Therefore, the decoding program 1006 removes the group of pixels (in this embodiment, 'P3') which is not decoded normally and thus it can obtain the decoded image having the low resolution.

[Third Modification]

In the above-described embodiment, the key image 1720 made of nonuniform gray-scale data (for example, the random number sequence) is used, but the present invention is not limited to this configuration. For example, a key image 1750 made of gray-scale data identical to an object to be encrypted of the input image 1710 may be used.

Figure 13A:
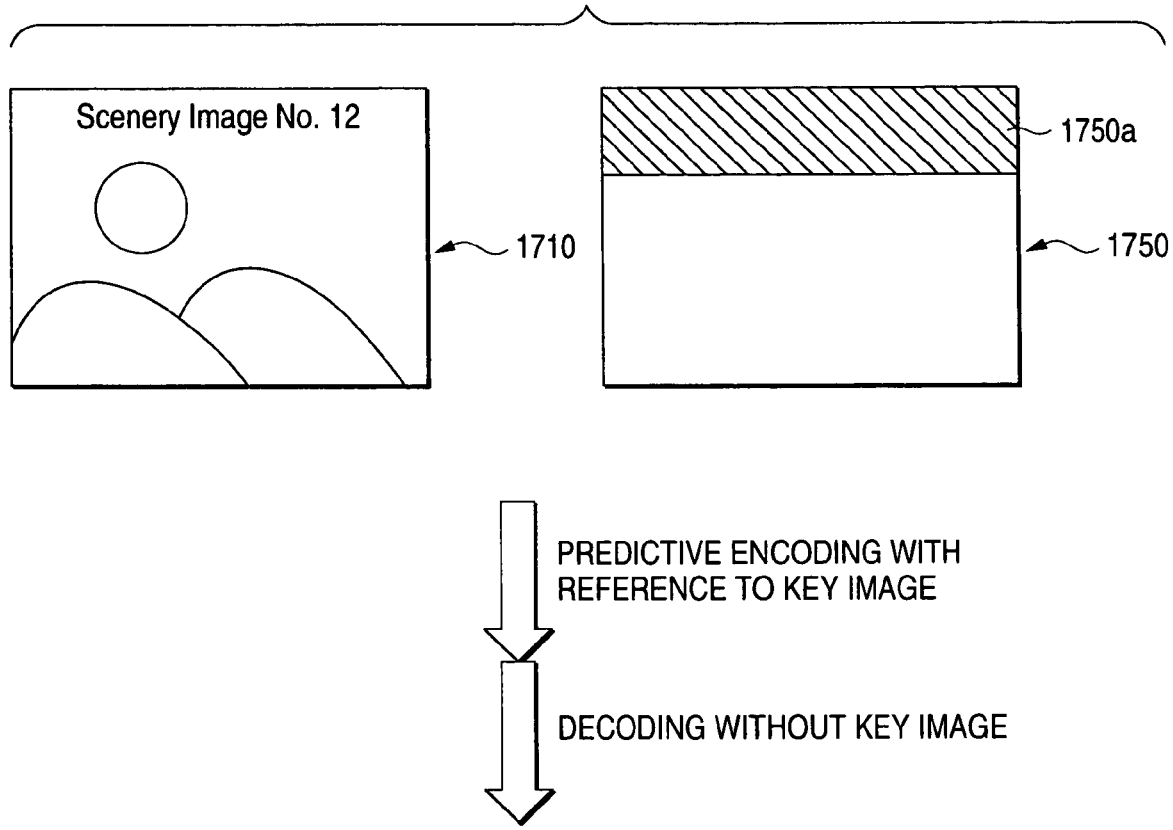
FIGS. 13A and 13B are diagrams illustrating a key image 1750 made of gray-scale data identical to an object (a character image) to be encrypted.
Figure 13B:
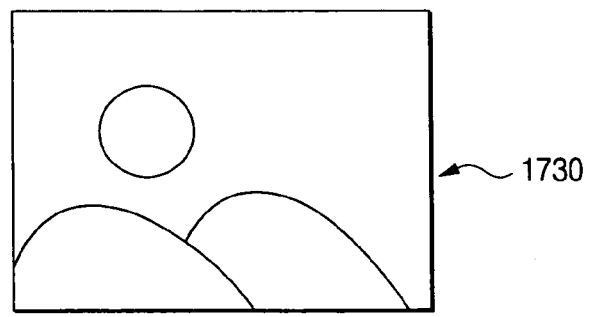

FIGS. 13A and 13B are diagrams illustrating the key image 1750 made of gray-scale data identical to an object (a character image) to be encrypted.

For example, as exemplarily shown in FIG. 13A, when performing the access control to the character image (for example, represented by the pixel value of 255) included in the input image 1710, the encoding program 1005 of the present modification creates the key image 1750 including a specified color area 1750*a* made of gray-scale data (the pixel value of 255) identical to the character image.

If the input image 1710 is encoded with reference to the key image 1750, the encoding program 1005 substitutes a portion corresponding to the character image 'Scenery Image No 12' with the code of the reference information (the reference pixel E) to the key image 1750.

Therefore, when the decoding program 1006 decodes code data without using the key image 1750, the portion corresponding to the character image 'Scenery Image No 12' cannot be normally decoded. Then, when the code is not decoded normally, as exemplarily shown in FIG. 13B, the decoding program 1006 can generate the decoded image 1730 in which the character image is encrypted, by applying one of the reference pixels A to D (that is, by extracting the pixel value with the in-image extracting unit 1630).

[Other Modifications]

Figure 14A:
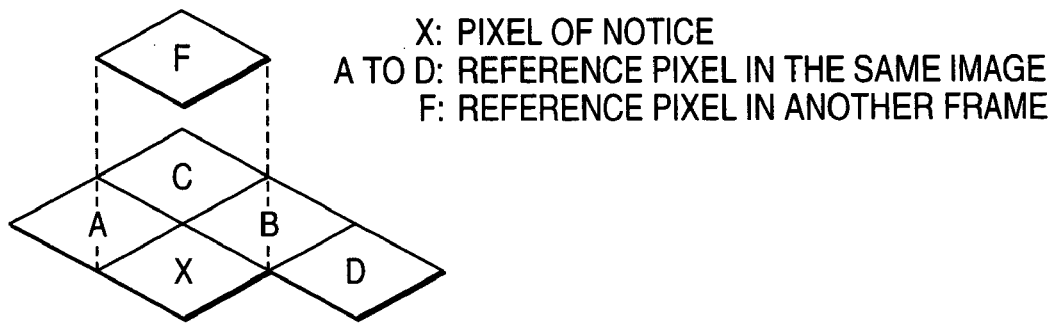
FIGS. 14A and 14B are diagrams illustrating an access control to a motion picture.
Figure 14B:
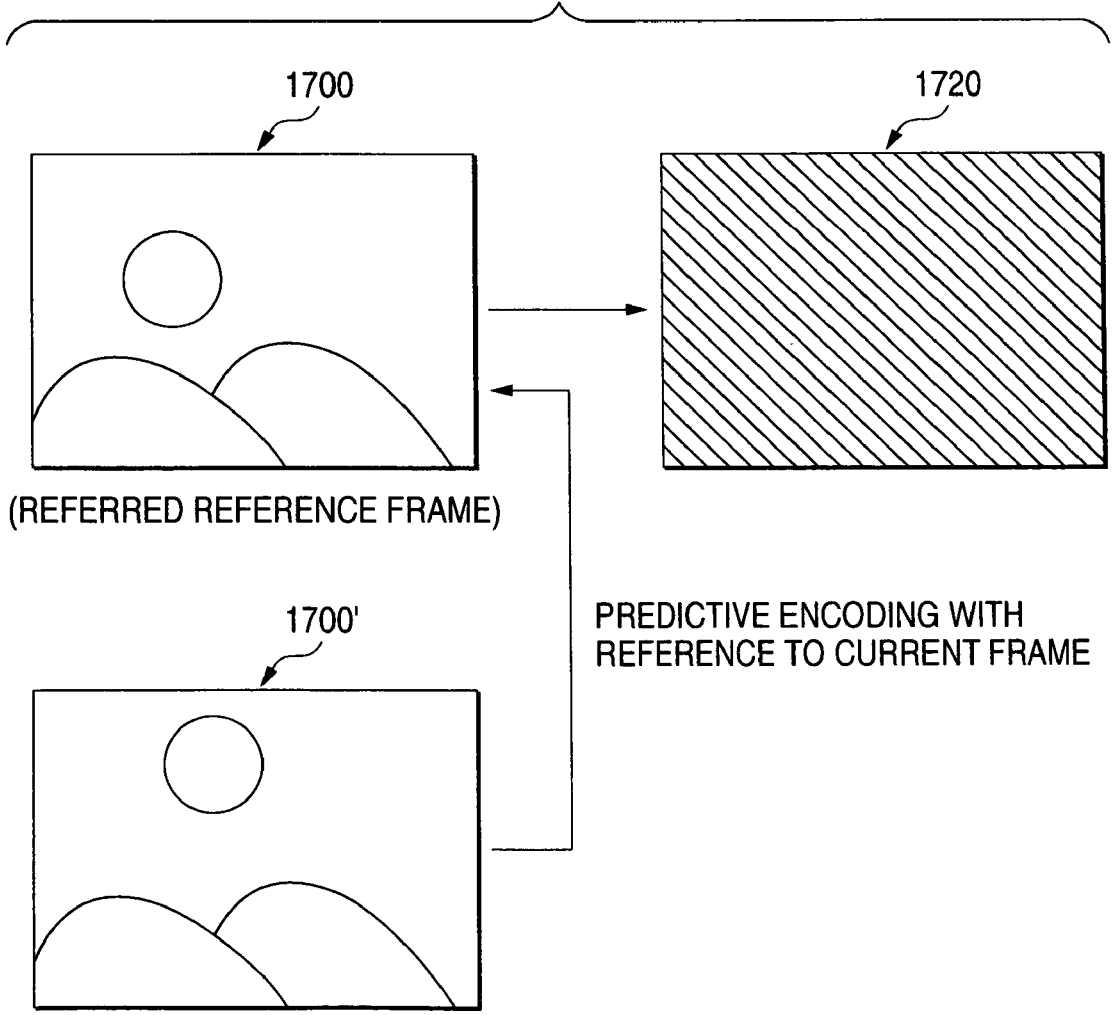

FIGS. 14A and 14B are diagrams illustrating an access control to a motion picture.

The motion picture is made of plural frame images. The frame images are consecutively displayed to be output as the motion picture and have high correlation with each other. Thus, when encoding one of the frame images constituting the motion picture as a frame of notice, the encoding program 1005 performs the predictive encoding with reference to another frame image, such that the frame of notice can be encoded with high compression rate.

Specifically, as exemplarily shown in FIG. 14A, the in-image prediction unit 1510 (FIG. 4) refers to the reference pixel F set on another frame image, in addition to the reference pixels A to D set in the frame of notice and, when the pixel value of the reference pixel F and the pixel value of the pixel of notice X match with each other, outputs the prediction unit ID of the reference pixel F to the run counting unit 1540 (FIG. 4).

Therefore, as exemplarily shown in FIG. 14B, the error processing unit 1640 of the present modification performs the predictive encoding process with reference to the key image 1720 only when encoding the referred frame (that is, the frame image on which the reference pixel F is set). Accordingly, if code data of the referred frame 1700 is decoded without using the key image 1720, the decoding program 1006 generates the referred frame 1700 having been scrambled and thus the current frame 1700' which is to be decoded with reference to the referred frame 1700 can be also in a scrambled state.

Moreover, when encoding the motion picture, the encoding program 1005 may apply the predictive encoding process with reference to the key image 1720 to all the frame images.

Figure 15:
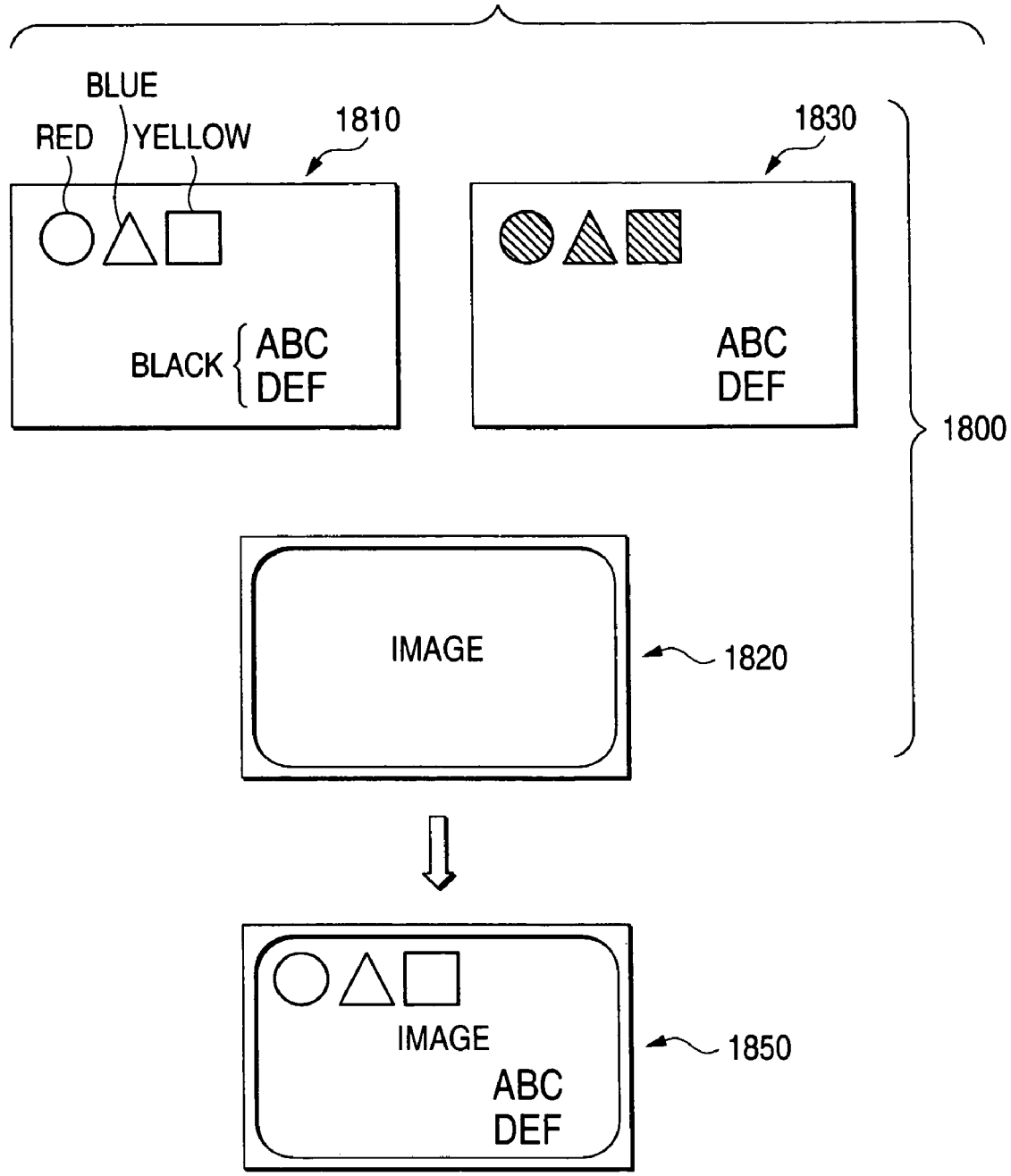
FIG. 15 is a diagram illustrating an access control to image data having a layer structure (an MRC format).

FIG. 15 is a diagram illustrating an access control to image data having a layer structure (an MRC format).

As exemplarily shown in FIG. 15, there is also a case in which image data 1800 is made of plural image layers to which image elements constituting an image are allocated and a selection layer which selects the image element to be output for each image area. Image data 1800 of this embodiment has a foreground layer 1810 and an image layer 1820 as an image layer and further has the selection layer 1830 which selects the image element to be output from the layers.

To the foreground layer 1810 of this embodiment, a low gray-scale image such as a simple CG image, a character image, or the like is allocated. Moreover, the foreground layer 1810 has plural color information and intermediate gray-scale information included in the CG image or the character image.

To the image layer 1820 of this embodiment, consecutive gray-scale image having the gray-scale level higher than that of the foreground layer 1810.

The selection layer 1830 is made of binary data indicating whether any one image element of the foreground layer 1810 and the image layer 1820 is output for each image area (for example, for each pixel) and a pattern image is made of binary data. In FIG. 15, a black portion of the selection layer 1830 is a pattern image which selects the image element of the foreground layer 1810 and a white portion thereof is a pattern image which selects the image element of the image layer 1820.

A display image 1850 appears by displaying or printing the image element selected according to the binary pattern, which is included in the selection layer 1830, among the image elements included in the foreground layer 1810 and the image layer 1820.

When performing the access control to image data 1800 having the layer structure (MRC format) in such a manner, the encoding program 1005 applies the predictive encoding process with reference to the key image 1720 to at least the encoding process of the layer image to which the image element to be encrypted is allocated. For example, when performing the access control to the character image which is allocated to the foreground layer 1810, the encoding program 1005 applies the predictive encoding process with reference to the key image 1720 to the encoding process of the foreground layer 1810.

Further, when the foreground layer 1810 is made to have only color information of the character image without having shape information of the character image (that is, when the foreground layer 1810 is simply coated the color of the character image and the selection layer 1830 has shape information of the character image as the binary pattern), the encoding program 1005 applies the predictive encoding process with reference to the key image 1720 made of the random binary pattern to the encoding process of the selection layer 1830. Accordingly, according to presence or absence of the key image 1720, the access to shape information of the character image is controlled, and thus the reproduction of the character image is controlled.

The entire disclosure of Japanese Applications No. 2004-254086 filed on Sep. 1, 2004 including specifications, claims, drawings and abstracts is incorporated herein by reference in its entirety.

What is claimed is:

1. An encoding device to encode an object image to be encoded comprising:
   a reference information generating unit that generates reference information with respect to a key image different from the object image;
   a code generating unit that generates code data of the reference information generated by the reference information generating unit as code data of at least a portion of the object image; and
   a difference calculating unit that calculates a difference between image data of the object image and image data of the key image,
   wherein the reference information generating unit makes the difference calculated by the difference calculating unit as a part of the reference information with respect to the key image.

2. The encoding device according to claim 1,
   wherein, when encoding an area of notice included in the object image, the reference information generating unit further generates reference information with respect to another area of the object image, and
   the code generating unit generates code data of the reference information with respect to another area of the object image or code data of the reference information with respect to the key image as code data of the area of notice included in the object image.

3. An encoding device to encode an object image to be encoded comprising:
   a reference information generating unit that generates reference information with respect to a key image different from the object image;
   a code generating unit that generates code data of the reference information generated by the reference information generating unit as code data of at least a portion of the object image;
   a key image generating unit that generates the key image based on a password; and
   a key image synthesizing unit that creates a synthesized key image based on a plurality of key images generated based on a plurality of passwords by the key image generating unit and layout information of a partial image to be encrypted,
   wherein the reference information generating unit compares the synthesized key image created by the key image synthesizing unit to the object image and generates reference information with respect to the synthesized key image based on a comparison result.

4. The encoding device according to claim 3,
   wherein the key image generating unit generates the key image based on the plurality of passwords hierarchically generated from one full password,
   the key image synthesizing unit creates one synthesized key image based on the plurality of key images generated based on the password which is generated from one full password, and
   the reference information generating unit compares the synthesized key image created based on one full password to the object image and generates the reference information with respect to the synthesized key image.

5. An encoding device to encode an object image to be encoded comprising:
   a reference information generating unit that generates reference information with respect to a key image different from the object image;
   a code generating unit that generates code data of the reference information generated by the reference information generating unit as code data of at least a portion of the object image; and
   wherein the key image includes a filled area which is filled with the same gray-scale value as an image element to be encrypted, and
   the reference information generating unit compares the object image including the image element to be encrypted to the key image including the filled area and generates the reference information with respect to the key image for an area the gray-scale value of which matches with the gray-scale value of the image element.

6. A decoding device to decode input code data to image data of a decoded image comprising:
   a reference data extracting unit;
   an image data generating unit;
   a key image generating unit; and
   a password generating unit that generating a plurality of passwords based on an input password,
   wherein the key image generating unit generates a plurality of key images based on the plurality of passwords generated by the password generating unit,
   the reference data extracting unit extracts image data from the plurality of key images generated by the key image generating unit.

7. A computer readable storage medium storing:
   reference information with respect to a key image, the key image being different from an object image to be encoded;

code data of the reference information, the code data being generated of at least a portion of the object image; and calculated information calculated from a difference between image data of the object image and image data of the key image, wherein the calculated information is a part of the reference information with respect to the key image.

8. A computer readable storage medium storing:

a key image generated based on a password, the key image being different from an object image to be encoded;

reference information with respect to the key image;

code data of the reference information, the code data being generated of at least a portion of the object image to be encoded; and a synthesized key image, the synthesized key image being generated from a plurality of key images and layout information of a partial image to be encrypted, wherein reference information is generated by comparing the synthesized key image to the object image.

9. A computer readable storage medium storing:

generated image data, generated from at least a portion of a decoded image;

a plurality of passwords, generated based on an input password, a plurality of key images, generated based on the plurality of passwords; and extracted image data, extracted based on an input code data from the plurality of key images.

10. An encoding device to encode an object image to be encoded comprising:

a reference information generating unit that generates reference information with respect to a key image different from the object image;

a code generating unit that generates code data of the reference information generated by the reference information generating unit as code data of at least a portion of the object image; and a key image generating unit that generates the key image based on a password; and a key image synthesizing unit that creates a synthesized key image based on a key image generated based on a password by the key image generating unit and layout information of a partial image to be encrypted, wherein the reference information generating unit compares the synthesized key image created by the key image synthesizing unit to the object image and generates reference information with respect to the synthesized key image based on a comparison result.

* * * * *